United States Patent Office 3,620,142
Patented Nov. 16, 1971

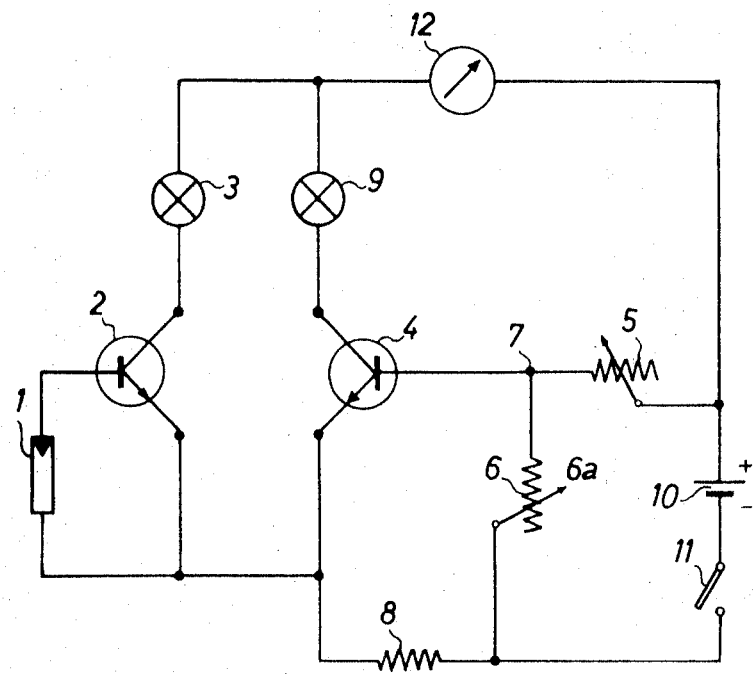

3,620,142
ILLUMINATING CONTROL ARRANGEMENT FOR PHOTOGRAPHIC CAMERAS
Dieter Engelsmann, Unterhaching, and Günter Pawlik, Munich, Germany, assignors to Agfa-Gevaert Aktiengesellschaft, Leverkusen, Germany
Filed June 18, 1968, Ser. No. 737,895
Claims priority, application Germany, June 23, 1967, A 56,077
Int. Cl. G03b 7/16; G01j 1/44
U.S. Cl. 95—10 C
9 Claims

ABSTRACT OF THE DISCLOSURE

An arrangement for adapting flash equipment in photographic cameras to daytime use as well as nighttime conditions. Two transistors have their emitters connected together and are, in turn, connected to a single source of current. The base-emitter path of one transistor includes a light sensor for the purpose of controlling the transistor as a function of the prevailing light conditions. The second transistor includes a variable resistor in its base-emitter path, which is set in accordance with the object distance. This setting of the variable resisor produces control of the diaphragm of a camera to thereby limit the amount of light received by the film from the object to be photographed as a function of the applicable guide number. Each collector of the two transistors includes an indicating lamp in its circuit so as to provide a visual indication of the current or conducting state of a transistor. The combined action of the two transistors is such that as the prevailing light intensity decreases the transistor associated with the variable resistor becomes increasingly conductive.

BACKGROUND OF THE INVENTION

Cameras are known in the art in which a photo resistor is used as the light sensitive receiver or element. The resistor is connected in parallel with the flash apparatus, and a voltage sensitive switch is electrically connected to the photo resistor. This voltage sensitive switch functions within the circuit of the flash apparatus. The voltage sensitive switch is directly actuated by the current flowing through the photo resistor as a function of the prevailing light intensity brightness. Under daylight conditions, the photo resistor has relatively low resistance characteristics. As a result, the voltage at the electrical switch is insufficient to cause the switch to close. With increased brightness, on the other hand, the resistance of the photo resistor also increases and this, in turn, causes the potential applied to the voltage sensitive switch to increase also. When dropping below a predetermined brightness level, the electrical switch commences to conduct, and as a result the flash bulb is ignited upon taking of an exposure.

This arrangement has the disadvantage that only flash exposures or daytime exposures may be carried out with the camera. It is not possible with this arrangement, to take flash exposures in the daytime for the purposes of illuminating or brightening of shady or shadowed areas of an object, as often desirable. Furthermore, even if the prevailing light intensity is relatively low, it is not possible to take flash exposures unless the prevailing light intensity or brightness drops below the level at which the designed flash equipment operates effectively. It is often desirable, however, to take flash exposures under such brightness conditions. Such a situation arises especially when increased sharpness of the exposure is to be attained through the use of a smaller diaphragm or a picture.

It is accordingly an object of the present invention to provide a camera with which flash exposures may be taken under any brightness conditions of the object. In this aspect of the invention, it is also an object to provide for automatic setting of the diaphragm to realize proper brightness relationships.

The objects of the present invention are achieved through an arrangement in which two current circuits are connected to a single power supply. The first one of these current circuits includes a light sensor element for purposes of controlling the diaphragm aperture of a camera as a function of the prevailing brightness or light intensity. The second one of the current circuits includes a variable resistor adjusted or set as a function of the object distance. The variable resistor provides for the correct guide number in the control of the diaphragm of the camera. At the same time, the two current circuits are arranged relative to each other so that the current flow through the measuring instrument, under failing light conditions, is determined increasingly through the second current circuit.

In the structural embodiment of the present invention the two current circuits each have a transistor for the purpose of controlling the current through the measuring instrument, and thus controlling the deflection of the instrument.

It is advantageous when the two current circuits each include an indicating arrangement from which the illuminating conditions corresponding to the currents through the circuits are presented in a visual manner. In a very simple embodiment of such an indicating arrangement, each of the collector circuits of each transistor in the current circuits, includes an indicating lamp connected in series with the collector circuit.

In a further advantageous embodiment of the present invention, a fixed resistor is connected to the emitters of both transistors for the purpose of realizing a cut-off voltage for the part of the circuit depending upon the distance involved. This cut-off voltage is a function of the magnitude of the current in the light dependent portion of the circuit.

To take into account different guide numbers for illuminating arrangements, a variable resistor is provided in the base circuit of the transistor associated with the distance dependent portion of the circuit. In another embodiment of the present invention, a variable resistor is provided in the emitter circuit of the transistor associated with the distance dependent portion of the circuit, for the purpose of taking into account different guide numbers for illuminating arrangements.

In an advantageous design a variable resistor provides control of the distance dependent portion of the circuit by being connected in the base-emitter circuit of the associated transistor. The variable resistor is set through the distance setting device and exercises the desired control through the voltage drop across it. In a further embodiment, in accordance with the present invention, the variable resistor is replaced by a plurality of fixed resistors which may be switched into the circuit by the distance setting mechanism.

SUMMARY OF THE INVENTION

An electronic arrangement in photographic cameras for controlling the amount of illumination received by the film from an object when taking flash exposures. The camera is adapted to taking the flash exposures both in daytime conditions and nighttime or darkness conditions. The emitter-collector paths of two transistors are connected in parallel and across a single current source. The base-emitter path of one transistor includes a light sensor which regulates the current through the transistor as a function of the prevailing light conditions. The second transistor includes a variable resistor in its base-emitter circuit. This variable resistor is set as function of the object distance so as to produce proper control of the diaphragm as a function of the desired guide numeral. The current conducting states of the two transistors may be visually determined through the observation of two indicating lamps connected in series with each transistor collector. A current meter is connected to both collectors of the two transistors and the current through the meter is regulated so that as the prevailing light intensity decreases the second transistor increasingly provides the current through the meter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

An electrical schematic diagram of the electronic components and their interconnections by which of the diaphragm control of a measuring instrument is realized in photographic cameras under flash or daytime operating condition, in accordance with the present invention.

DESCRIPTION OF THE PREFERRED EMBODIMENTS

Referring to the drawing, a light sensitive receiving element 1 is connected between the base and the emitter of a transistor 2. For the purpose of making visible the current state of the transistor 2, an indicating lamp 3 is connected in series with the collector circuit of a transistor. A second transistor 4 is controlled through variable resistors 5 and 6 which form a voltage divider. The base of the transistor 4 is connected to the tap 7 of the voltage divider. The variable feature for adjustable resistor 5 serves for taking into account the light intensity or brightness parameters of photographic flash arrangements of variable strength or intensity. The adjustable terminal 6a of the variable resistor 6 is in the form of a sliding contact and is adjustable as a function of the distance of the object from the flash attachment or arrangement. The sliding contact 6a is connected to a distance setting device of a camera, not shown, in cases when regulating functions are to be exercised. The variable resistor 6 varies the base potential of the transistor 4 in accordance with the distance set. As a result, the transistor 4 is controlled in accordance with the distance parameter.

A fixed resistor 8 is connected to both the emitters of the transistors 2 and 4. These emitters of the transistors are connected to a junction and the resistor 8 has one terminal connected to the junction. An indicating lamp 9 is further provided in the collector circuit of the transistor 4 for the purpose of indiciating the current state or the conducting state of the transistor 4. A battery 10 is connectable to the circuitry, in accordance with the present invention, through means of a switch 11 actuated in the conventional manner by the camera release mecahnism. A measuring instrument 12 is connected to both of the collector circuits of the two transistors 2 and 4. The measuring instrument 12 serves the purpose of producing the correct setting of the diaphragm in accordance with the prevailing light intensity or brightness, in the conventional manner. The deflection of the indicator of the instrument is, for example, sampled or detected by a sampling arrangement, and the resulting measured value is then applied to a diaphragm setting device of the camera.

The film speed or film sensitivity can be taken into account in the conventional manner by turning the measuring instrument 12, and also by a corresponding modification in the sampling arrangement. Further possibilities for taking into account the film speed or film sensitivity, reside in applying a diaphragm before the light sensitive receiving element 1. The diaphragm, in this design, is coupled to at least one resistor in the distance dependent portion of the circuit. At the same time, such a resistor in conjunction with the diaphragm may be connected in front of the measuring instrument 12.

When increased brightness conditions prevail as, for example, in daylight exposures, a voltage appears across the light sensor 1 as a function of the prevailing light conditions. This voltage then serves to control the transistor 2. As a result of the drop in voltage across the resistor 8 due to the current flowing through the transistor 2, the transistor 4 remains cut off or turned off. Accordingly, the total current determining the deflection of the instrument 12, flows entirely through the transistor 2. When the prevailing brightness or light intensity is reduced, the current through the transistor 2 is also reduced, and this produces an increase in the voltage between the base and the emitter of transistor 4. With the rise in this voltage between the base and the emitter of the transistor 4, the latter begins finally to conduct. During this state of the transistor 4 current flows through the transistor corresponding to the decrease in voltage across the variable resistor 6. At constant conductivity, corresponding to a constant value of setting of the variable resistor 5, a current through the transistor 4 is, therefore, a function of the exposure distance. Under these circumstances, the current through instrument 12 is determined by the combined effect of current components through the transistor 2 and the transistor 4.

When the prevailing light intensity or brightness is still further reduced, transistor 2 becomes less conducting, and the current through the instrument 12 becomes more and more dependent upon the exposure distance. When dropping below a predetermined brightness or light intensity limit, the transistor 2 becomes fully cut-off or turned-off. In that case the current flowing through instrument 12 is then only dependent upon an inserted or set exposure distance.

With this preceding arrangement flash exposures may be taken at any prevailing light conditions. When flash exposures are to be taken in complete darkness or in conventional room lighting, the diaphragm in the camera is controlled purely as a function of the distance. This condition prevails for complete cut-off of the transistor 2. When taking flash exposures in daylight for the purpose of brightening up shaded portions of the object, an erroneous exposure distance would be realized. This would result from the condition that an incorrect light response of the brighter portions of the object is obtained. As a result of the cut-off of transistor 4, however, this condition is avoided.

In practice it is often desirable to take flash exposures during dim light conditions, even though the daytime or daylight automatic mechanism of the camera is capable of functioning. If, a flash exposure is now taken with a conventional distance of, for example, 3 meters or less, excessive brightness would occur as a result of the large additional amount of light applied by the flash. Through the arrangement in accordance with the present invention, however, this type of situation is avoided. This results from the condition that under these circumstances the transistor 2 takes into account the daylight component, while the transistor 4 takes into account the distance dependent portion of the flash.

It will be understood that each of the elements described above, or two or more together, may also find a useful application in other types of constructions differing from the types described above.

While the invention has been illustrated and described as embodied in brightness control for photographic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a photographic camera having a diaphragm and adapted for use with a flash unit, an arrangement for setting said diaphragm in correspondence to ambient and flash illumination of the object to be photographed, comprising, in combination, first circuit means furnishing a first signal independent of the absence or presence of said flash unit; varying means connected to said first circuit means for varying said first signal as a function of the distance to the object to be photographed; a light-sensitive element mounted on said camera to receive said ambient light and furnish an electrical signal corresponding thereto; second circuit means having a control circuit connected to said light-sensitive element and an output circuit interconnected with said first circuit means, said output circuit furnishing a second signal corresponding to said electrical signal, increasing amplitudes of said second signal causing decreasing amplitudes of said first signal, said first signal decreasing to zero at a predetermined amplitude of said second signal; and deflection means connected to said first and said second circut means, said deflection means having a movable element deflecting from a null position to a control position corresponding to the sum of said first and second signals.

2. A photographic camera as set forth in claim 1, further comprising connecting means connecting said movable element and said diaphragm means, for setting said diaphragm in correspondence to the position of said movable element relative to said null position.

3. A photographic camera as set forth in claim 2, wherein said first and second circuit means respectively comprise a first and second transistor.

4. A photographic camera as set forth in claim 3, wherein said varying means comprise a variable resistance means.

5. A photographic camera as set forth in claim 4, wherein said first circuit means comprise a fixed resistance connected to the emitter of said first transistor; and wherein the emitter of said second transistor is connected to the emitter of said first transistor.

6. A photographic camera as set forth in claim 5, including a source of electrical energy having a first and second terminal; wherein said deflecting means have a first and second deflecting terminal; further including means connecting said first deflecting terminal to said first terminal of said source of electrical energy and means connecting said second deflecting terminal to the collectors of said first and second transistors.

7. A photographic camera as set forth in claim 6, further comprising first current-responsive indicator means connected between the collector of said first transistor and said second deflecting terminal.

8. A photographic camera as set fotrh in claim 6, further comprising second current-responsive indicator means connected between the collector of said second transistor and said second deflecting terminal.

9. A photographic camera as set forth in claim 6, further comprising second variable resistance means, adjustable as a function of a determined characteristic of said flash unit, connected between the base of said first transistor and said first terminal of said source of electric energy.

References Cited

UNITED STATES PATENTS

| | | | |
|---|---|---|---|
| 3,344,724 | 10/1967 | Taguchi | 95—10 C |
| 3,487,757 | 1/1970 | Kiper | 95—10 C |
| 3,511,574 | 5/1970 | Burgarella | 95—10 C X |
| 3,062,092 | 11/1962 | Schmidt | 356—226 |
| 3,072,028 | 1/1963 | Lange | 95—10 C |
| 3,452,656 | 7/1969 | Ruhle et al. | 95—10 C |

JOSEPH F. PETERS, JR., Primary Examiner

U.S. Cl. X.R.

95—64A; 356—226